(12) United States Patent
Wei

(10) Patent No.: US 11,982,477 B2
(45) Date of Patent: May 14, 2024

(54) ELECTRONIC EXPANSION VALVE

(71) Applicant: ZHEJIANG SANHUA INTELLIGENT CONTROLS CO., LTD, Zhejiang (CN)

(72) Inventor: Xianrang Wei, Zhejiang (CN)

(73) Assignee: ZHEJIANG SANHUA INTELLIGENT CONTROLS CO., LTD, Zhejiang (CN)

( * ) Notice: Subject to any disclaimer, the term of this patent is extended or adjusted under 35 U.S.C. 154(b) by 331 days.

(21) Appl. No.: 17/617,339

(22) PCT Filed: Jun. 28, 2020

(86) PCT No.: PCT/CN2020/098382
§ 371 (c)(1),
(2) Date: Dec. 8, 2021

(87) PCT Pub. No.: WO2020/259658
PCT Pub. Date: Dec. 30, 2020

(65) Prior Publication Data
US 2022/0178600 A1 Jun. 9, 2022

(30) Foreign Application Priority Data

Jun. 28, 2019 (CN) .......................... 201910574593.5
Jun. 28, 2019 (CN) .......................... 201910574621.3

(51) Int. Cl.
*F25B 41/35* (2021.01)
*F16K 31/04* (2006.01)

(52) U.S. Cl.
CPC ............ *F25B 41/35* (2021.01); *F16K 31/047* (2013.01)

(58) Field of Classification Search
CPC ........ F25B 41/35; F25B 41/38; F16K 31/047; F16K 31/0655; F16K 25/005; F16K 1/32; F16K 1/02; Y02B 30/70
See application file for complete search history.

(56) References Cited

U.S. PATENT DOCUMENTS

| | | | |
|---|---|---|---|
| 6,220,571 B1 * | 4/2001 | Kim ...................... | F16K 31/047 251/903 |
| 6,561,480 B1 * | 5/2003 | Komiya ................ | F25B 41/347 251/129.05 |
| 11,287,167 B2 | 3/2022 | Tang et al. | |
| 2009/0293520 A1 | 12/2009 | Hayashi et al. | |

(Continued)

FOREIGN PATENT DOCUMENTS

| CN | 2846913 Y | 12/2006 |
|---|---|---|
| CN | 204164453 U | 2/2015 |

(Continued)

OTHER PUBLICATIONS

Japanese Office Action dated Oct. 11, 2022 for Japanese Appl. No. 2021-570414.

(Continued)

*Primary Examiner* — Patrick C Williams
(74) *Attorney, Agent, or Firm* — Ohlandt, Greeley and Perle, LLP

(57) ABSTRACT

An electronic expansion valve includes a valve needle screw assembly which includes a valve needle, a valve needle sleeve, a washer part, a spring, and a screw assembly. The valve needle sleeve includes a circumferential wall part and a fitting part. The inner diameter of the fitting part is smaller than the inner diameter of the circumferential wall part. The screw assembly includes a lower stopper part, a valve needle support part, and an upper stopper part. The lower stopper part abuts against the washer part. The valve needle support part abuts against the fitting part of the valve needle sleeve. The upper stopper part abuts against the spring. The distance between the valve needle support part and the washer part is (Continued)

D1; the distance between the valve needle support part and the upper end of the fitting part is D2; and D1≥D2.

9 Claims, 17 Drawing Sheets

(56) References Cited

U.S. PATENT DOCUMENTS

| | | | |
|---|---|---|---|
| 2010/0181514 A1* | 7/2010 | Ohuchi | F16K 31/047 |
| | | | 251/284 |
| 2011/0084224 A1 | 4/2011 | Zhan et al. | |
| 2013/0206851 A1 | 8/2013 | Sekiguchi | |
| 2015/0184768 A1* | 7/2015 | Zhan | F25B 41/35 |
| | | | 251/65 |
| 2019/0368792 A1 | 12/2019 | Tang et al. | |

FOREIGN PATENT DOCUMENTS

| | | |
|---|---|---|
| CN | 107289144 A | 10/2017 |
| CN | 108317259 A | 7/2018 |
| CN | 207880164 U | 9/2018 |
| CN | 208634406 U | 3/2019 |
| CN | 209012452 U | 6/2019 |
| CN | 110145629 A | 8/2019 |
| JP | 2006064865 A | 3/2006 |
| JP | 2011058536 A | 3/2011 |
| JP | 2013108535 A | 6/2013 |
| JP | 2020514640 A | 5/2020 |
| KR | 20180065987 A | 6/2018 |
| WO | 2018133673 A1 | 7/2018 |

OTHER PUBLICATIONS

International Search Report dated Sep. 8, 2020 for PCT Appl. No. PCT/CN2020/098382.
Chinese Office Action dated Jun. 6, 2023 for Chinese Appl. No. 202080013129.X.
European Search Report dated Jul. 11, 2023 for European Appl. No. 20833234.6.

* cited by examiner

ELECTRONIC EXPANSION VALVE

This application is the national phase of International Application No. PCT/CN2020/098382, titled "ELECTRONIC EXPANSION VALVE", filed on Jun. 28, 2020, which claims the benefit of priorities to the following two Chinese patent applications: Chinese Patent Application No. 201910574621.3, titled "ELECTRONIC EXPANSION VALVE", filed with the China National Intellectual Property Administration on Jun. 28, 2019; and Chinese Patent Application No. 201910574593.5, titled "ELECTRONIC EXPANSION VALVE", filed with the China National Intellectual Property Administration on Jun. 28, 2019, the entire disclosures of which applications are incorporated herein by reference.

FIELD

The present application relates to the technical field of refrigeration control, and in particular to an electronic expansion valve.

BACKGROUND

FIG. 1 shows the structure of a typical valve needle assembly of an electronic expansion valve. The valve needle assembly of the electronic expansion valve has a screw rod 16', and the screw rod 16' and the valve needle 5' are connected in a floating manner via a sleeve 25'. A second washer 27' is arranged between the valve needle 5' and the sleeve 25'. A compression spring 8' is mounted in the sleeve 25', an upper end of the compression spring 8' abuts against the bushing at a lower end of the screw rod 16', and a lower end face of the compression spring 8' abuts against the bearing 24'.

The elastic load of the spring 8' passes through the bearing 24' and the steel ball 35', and finally acts on the valve needle 5'.

For the electronic expansion valve employing the valve needle assembly, the elastic load of the spring always acts between the screw rod and the valve needle, and the friction force experienced by the valve needle during the rotation of the screw rod is relatively large.

Therefore, those skilled in the art may optimize the design of the electronic expansion valve, to reduce the friction force experienced by the valve needle during the rotation of the screw rod.

SUMMARY

An object of the present application is to provide an electric valve, so as to reduce the friction force experienced by the valve needle during the rotation of the screw rod.

To achieve the above object, the following technical solutions are provided. An electronic expansion valve includes a valve needle screw rod assembly, the valve needle and screw rod assembly includes a valve needle, a valve needle sleeve, a washer portion, a spring, and a screw rod assembly; wherein the valve needle is fixedly connected to the valve needle sleeve, the valve needle sleeve includes a peripheral wall portion and a fitting portion, and an inner diameter of the fitting portion is smaller than an inner diameter of the peripheral wall portion;

the screw rod assembly includes a lower stop portion, a valve needle support portion and an upper stop portion, the lower stop portion includes a lower flange portion or a body portion, and the lower flange portion or the body portion is configured to abut against the washer portion;

the valve needle support portion includes a valve needle support washer or a suspension engagement portion or a bushing washer, and the valve needle support washer or the suspension engagement portion or the bushing washer is configured to abut against the fitting portion of the valve needle sleeve;

the upper stop portion includes an upper flange portion or an upper retaining ring, and the upper flange portion or the upper retaining ring is configured to abut against the spring; and in a case that the lower stop portion abuts against the washer portion, the distance between the valve needle support portion and the washer portion is D1, the distance between the valve needle support portion and the upper end of the fitting portion is D2, and D1≥D2.

In the electronic expansion valve according to the present application, before the spring is further compressed, the valve needle is suspended on the screw rod assembly via the valve needle sleeve, thus the valve needle is not subjected to the elastic load of the spring, which reduces the friction force experienced by the valve needle during the rotation of the screw rod.

Figure 1:
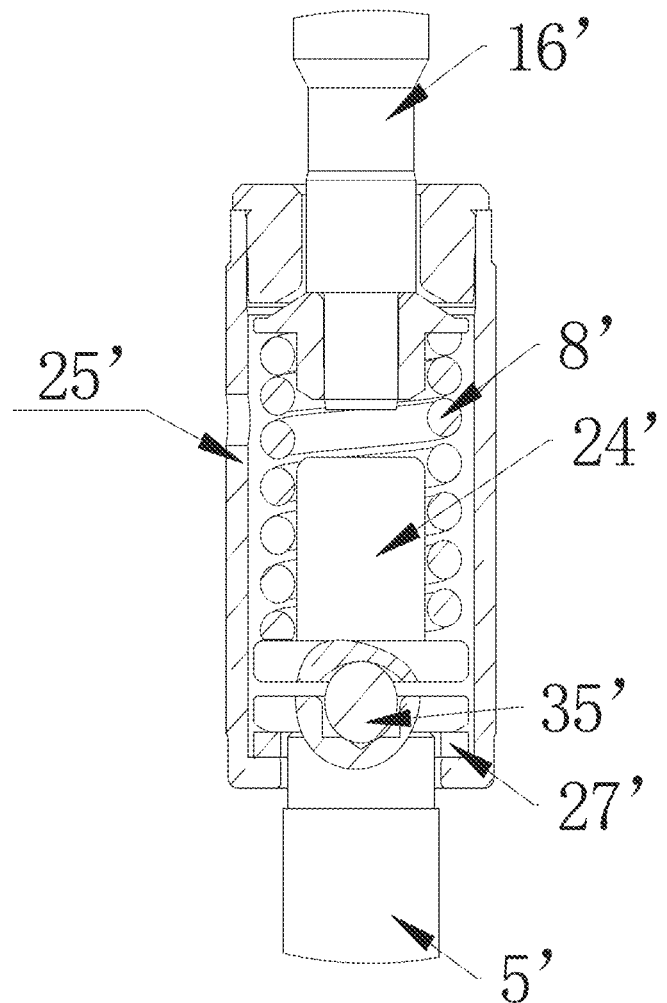
FIG. 1 shows the structure of a typical valve needle assembly of an electronic expansion valve.

The above drawings include the following reference numerals:

| | | | |
|---|---|---|---|
| 1 | valve needle and screw rod assembly, | | |
| 11 | valve needle, | 111 | valve needle sealing portion, |
| 113 | step portion, | 12 | valve needle sleeve, |
| 121 | fitting portion, | 127 | peripheral wall portion, |
| 13 | washer portion, | 14 | spring, |
| 15 | screw rod assembly, | 151 | screw rod, |
| 1511 | below-spring groove portion, | 1512 | valve needle support groove portion, |
| 1513 | valve needle support flange portion, | | |
| 1514 | above-spring annular groove, | 153 | lower stop portion, |
| 1531 | lower flange portion, | 154 | valve needle support portion, |
| 1541 | valve needle support washer, | 155 | upper stop portion, |
| 1551 | upper flange portion, | 1552 | upper retaining ring, |
| 156 | bushing component, | 1561 | structure hole portion, |
| 1562 | body portion, | 1563 | suspension engagement portion, |
| 20 | valve body, | 2 | valve seat assembly, |
| 21 | valve seat, | 211 | valve port, |
| 2111 | valve port sealing portion, | 212 | inner hole guide portion, |
| 22 | first connecting pipe portion, | 23 | second connecting pipe portion, |
| 24 | guide seat, | 241 | inner hole guiding portion, |
| 25 | connecting seat, | 3 | nut assembly, |
| 31 | nut, | 32 | nut connecting portion, |
| 33 | slip ring, | 4 | rotor assembly, |
| 41 | rotor magnet, | 47 | rotor connecting portion, |
| 43 | rotor stop portion, | 5 | housing, |
| 30 | stator coil. | | |

DETAILED DESCRIPTION OF THE EMBODIMENTS

For those skilled in the art to better understand technical solutions of the present application, the present application will be further described hereinafter in detail in conjunction with the drawings and specific embodiments.

Figure 2:
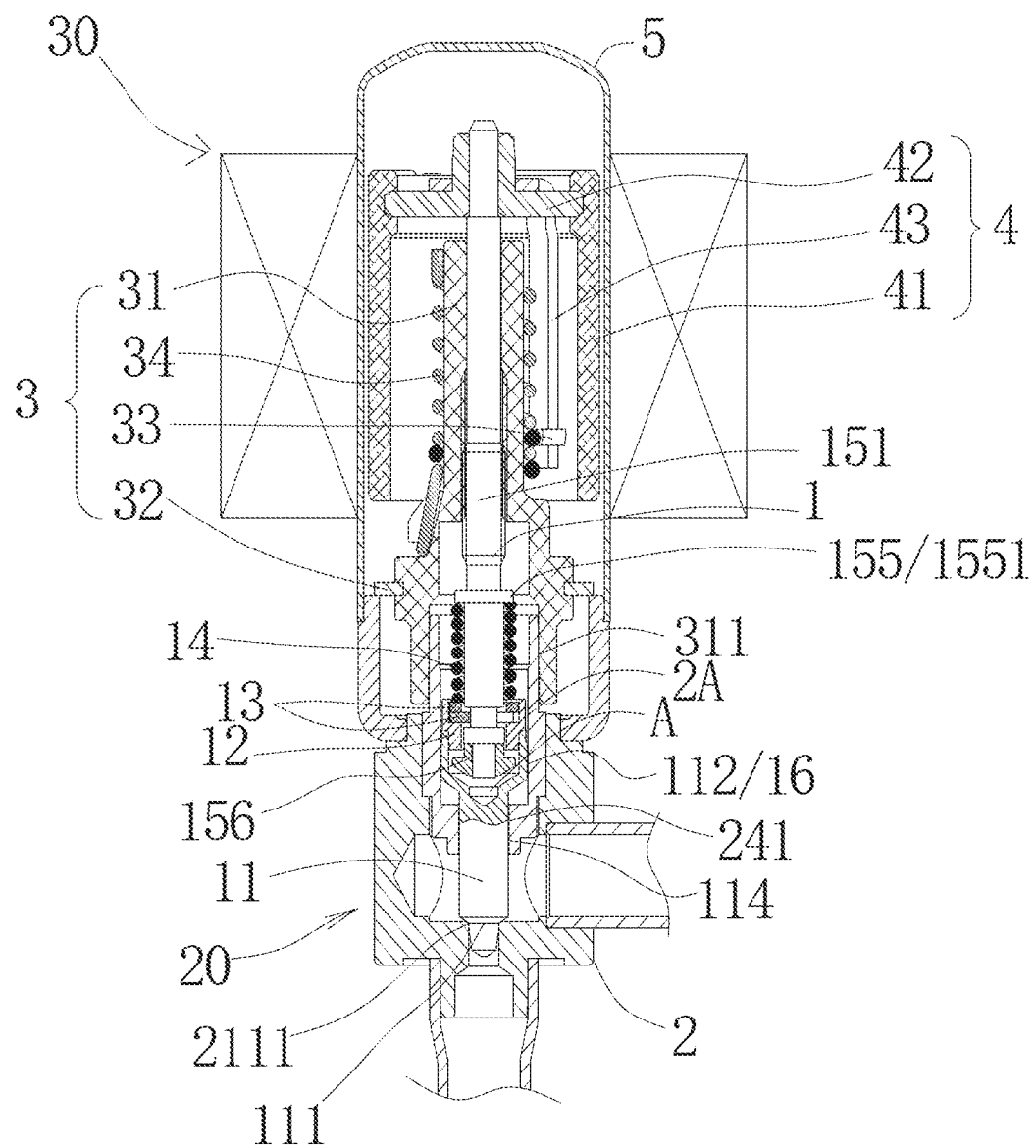
FIG. 2 is a sectional view showing an electronic expansion valve according to a first embodiment of the present application in a frilly closed state.
Figure 3:
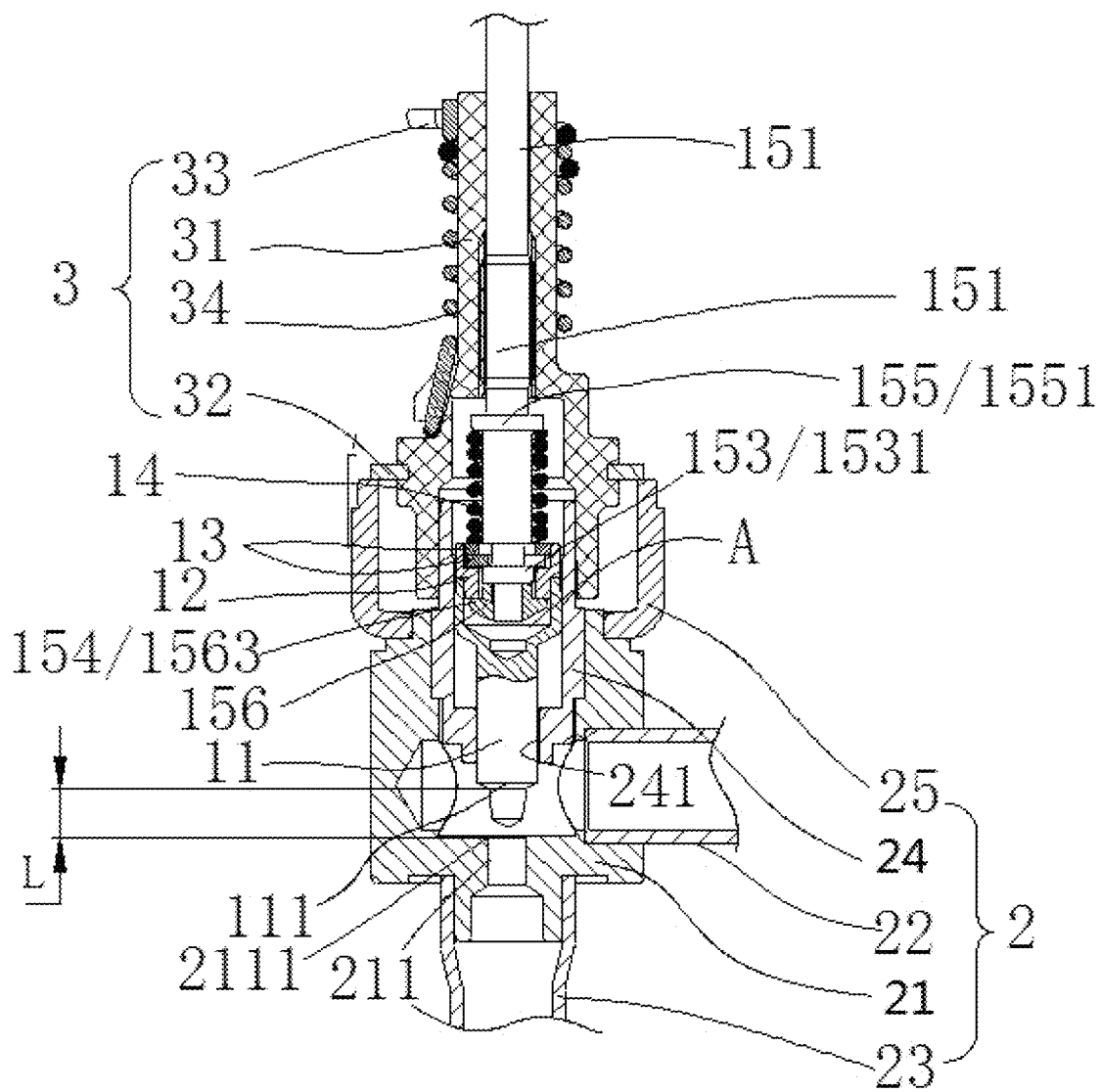
FIG. 3 is a partial sectional view showing the electronic expansion valve according to the first embodiment of the present application in a fully open state.
Figure 4:
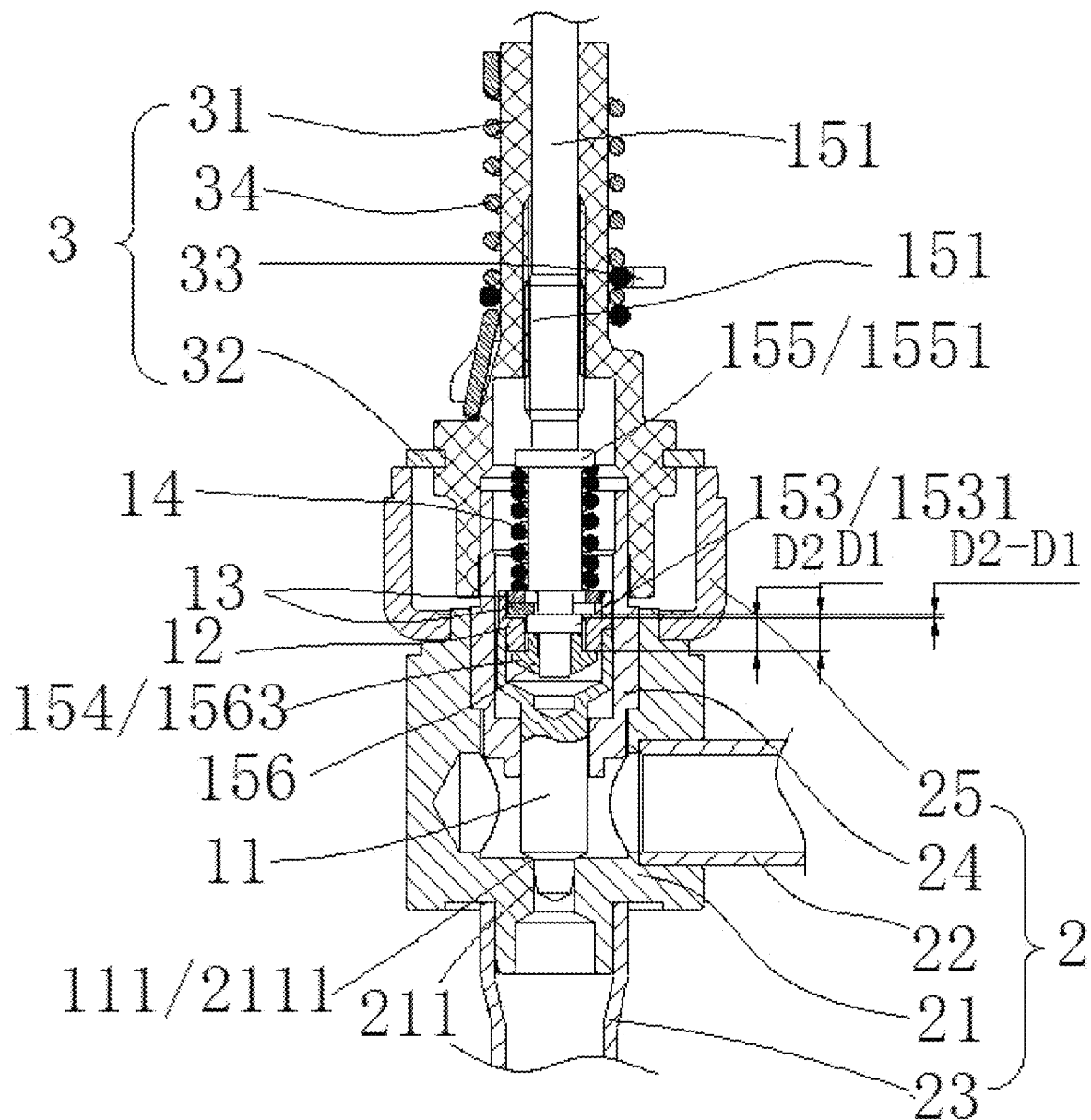
FIG. 4 is a partial sectional view showing a valve needle sealing portion and a valve port sealing portion according to the first embodiment of the electronic expansion valve of the present application just getting into contact with each other.
Figure 5:
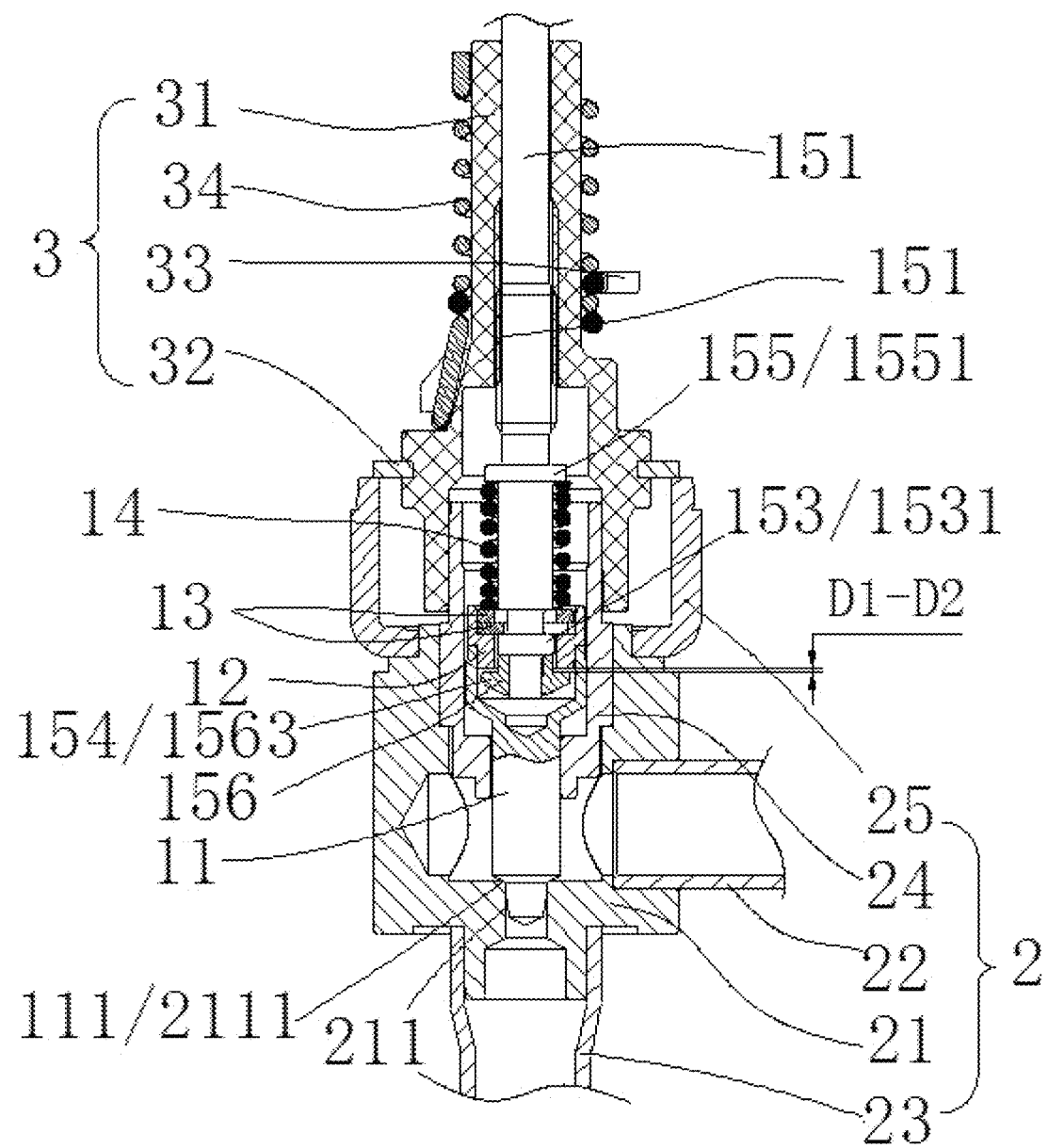
FIG. 5 is a partial sectional view showing the electronic expansion valve according to the first embodiment of the present application at a critical position before a spring is further compressed.
Figure 6:
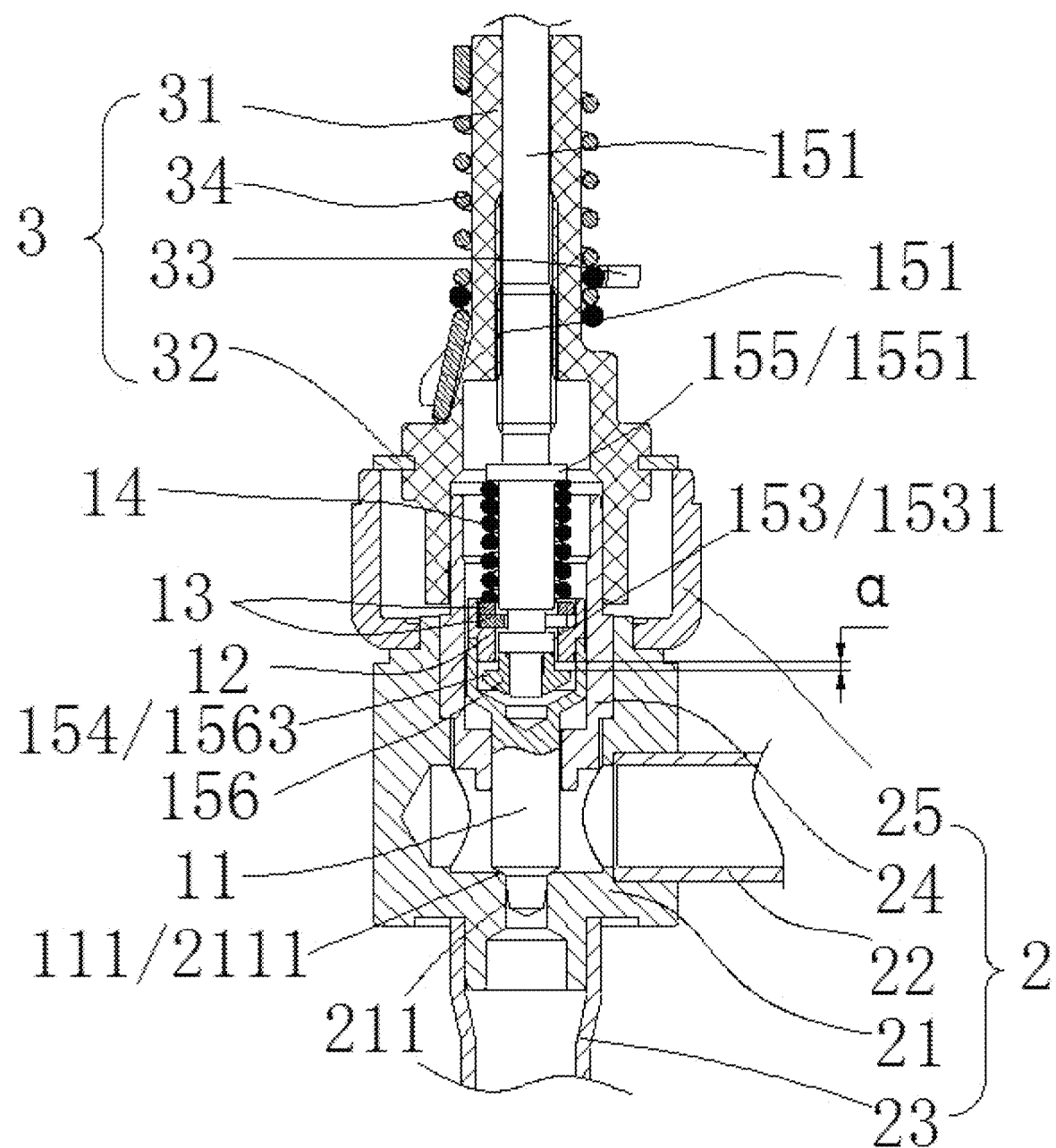
FIG. 6 is a partial sectional view of the electronic expansion valve according to the first embodiment of the present application in the fully closed state.
Figure 7:
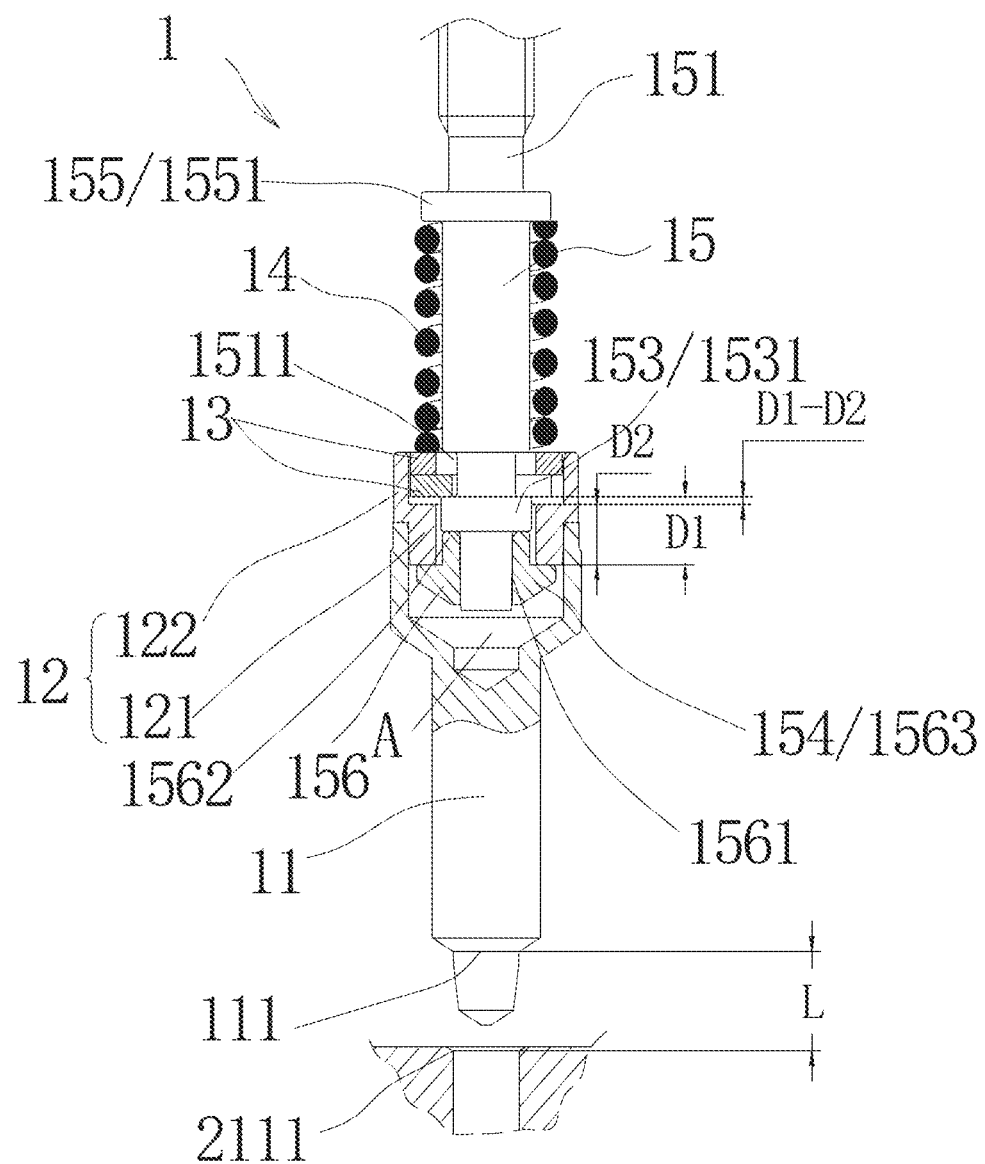
FIG. 7 is a sectional view showing a valve needle and screw rod assembly in FIG. 2.
Figure 8:
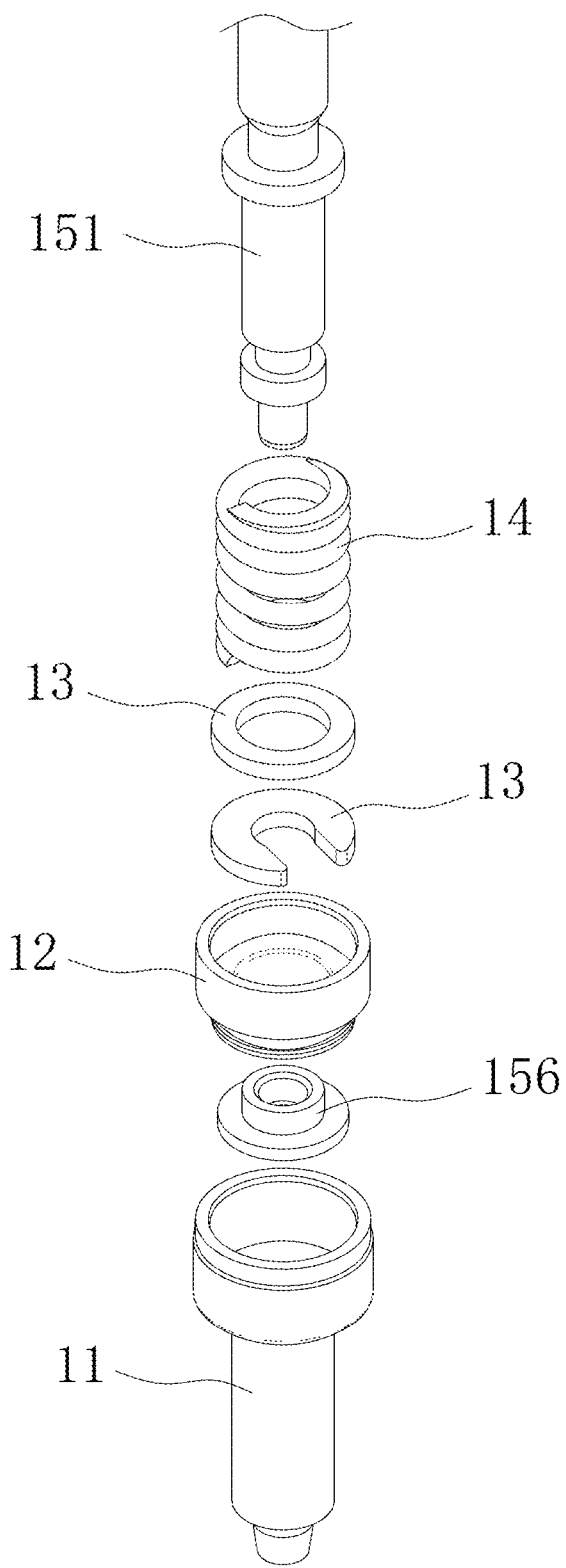
FIG. 8 is an exploded view showing the valve needle and screw rod assembly in FIG. 7.

Referring to FIG. 2 to FIG. 8, FIG. 2 is a sectional view showing an electronic expansion valve according to a first embodiment of the present application in a fully closed state; FIG. 3 is a partial sectional view showing the electronic expansion valve according to the first embodiment of the present application in a fully open state; FIG. 4 is a partial sectional view showing a valve needle sealing portion and a valve port sealing portion according to the first embodiment of the electronic expansion valve of the present application just getting into contact with each other; FIG. 5 is a partial sectional view showing the electronic expansion valve according to the first embodiment of the present application at a critical position before a spring is further compressed; FIG. 6 is a partial sectional view of the electronic expansion valve according to the first embodiment of the present application in the fully closed state; FIG. 7 is a sectional view of showing a valve needle and screw rod assembly in FIG. 2; and FIG. 8 is an exploded view showing the valve needle and screw rod assembly in FIG. 7.

With specific reference to FIG. 2, which is a sectional view showing an electronic expansion valve according to a first embodiment of the present application in a fully closed state, in a specific embodiment, the electronic expansion valve according to the present application includes a valve body 20 and a stator coil 30. The valve body 20 includes a valve needle and screw rod assembly 1, a valve seat assembly 2, a nut assembly 3, a rotor assembly 4 and a housing 5. The stator coil 30 of the electronic expansion valve is connected to a drive controller. After being energized, the drive controller sends a pulse drive signal to the stator coil 30. The stator coil 30 generates a periodically changing magnetic field, thereby driving the rotor assembly 4 of the electronic expansion valve to rotate in a forward or backward direction. The rotor assembly 4 is fixedly connected with a screw rod 151 of the valve needle and screw rod assembly 1. While the rotor assembly 4 rotates, the screw rod 151 is driven to rotate synchronously. The screw rod 151 of the valve needle and screw rod assembly 1 is provided with external threads, an inner hole of a nut 31 of the nut assembly 3 is provided with internal threads, and the screw rod 151 is threadedly engaged with the nut 31. When the rotor assembly 4 rotates, the screw rod 151 moves in an axial direction, thus driving the valve needle and screw rod assembly 1 to realize opening and closing of a valve port 211.

The valve seat assembly 2 according to this embodiment includes a valve seat 21, a first connecting pipe portion 22, a second connecting pipe portion 23, a guide seat 24 and a connecting seat 25. The first connecting pipe portion 22, the second connecting pipe portion 23, the guide seat 24 and the connecting seat 25 are fixedly assembled with the valve seat 21. The first connecting pipe portion 22 and the second connecting pipe portion 23 serve as an inflow or outflow channel of a fluid medium of the electronic expansion valve, and are generally used to be connected with system piping when the electronic expansion valve is mounted in a refrigeration or heating system such as an air conditioner. The valve seat 21 is provided with a valve port 211 at a position close to a center of the second connecting pipe portion 23, and a valve port sealing portion 2111 is provided on an upper edge of the valve port 211.

A central inner hole position of the guide seat 24 of the valve seat assembly 2 is provided with an inner hole guiding portion 241 that cooperates with an outer wall of the valve needle and screw rod assembly. When the electronic expansion valve is being opened or closed, the inner hole guiding portion 241 provides a guiding function for the valve needle and screw rod assembly.

The nut assembly 3 is coaxially arranged at an upper side of the valve seat assembly 2. The nut assembly 3 includes a nut 31, a nut connecting portion 32, a slip ring 33 and a spiral guide rail 34. The nut 31 may be fixedly connected to the valve seat assembly 2 via the nut connecting portion 32 by welding or the like. The slip ring 33 and the spiral guide rail 34 are arranged at an upper portion of an outer periphery of the nut 31. The slip ring 33 is able to spirally rotate along the spiral guide rail 34 within a limited stroke range in an up and down direction. The slip ring 33 and the spiral guide rail 34 cooperate with the rotor assembly 4, to realize control of the stroke of the electronic expansion valve between a fully open state and a fully closed state.

The rotor assembly 4 includes a rotor magnet 41, a rotor connecting portion 42, and a rotor stop portion 43 (the rotor stop portion 43 and the rotor magnet 41 may be integrally formed, in this embodiment, they are assembled together after being separately formed). The rotor assembly 4 may be fixedly connected to (for example, connected by welding) the screw rod 151 of the valve needle and screw rod assembly 1 via the rotor connecting portion 42, the rotor assembly 4 is driven by the stator coil 30 to drive the screw rod 151 to rotate synchronously. The rotor stop portion 43 is arranged at an inner side of the rotor assembly 4. The rotor stop portion 43 cooperates with the slip ring 33 and the spiral guide rail 34 on the nut 31, to limit the rotation of the rotor assembly 4 to be within a determined stroke range.

In addition, the electronic expansion valve according to this embodiment further includes a housing 5 with an open end, the housing 5 is sleeved outside the rotor assembly 4, and the open end of the housing 5 is sealingly welded to the connecting seat 25 located at the upper side of the valve seat assembly 2, to form a sealed accommodating cavity.

The valve needle and screw rod assembly 1 mainly includes a valve needle 11, a valve needle sleeve 12, a washer portion 13, a spring 14 and a screw rod assembly 15. Specifically, referring to FIG. 7 and FIG. 8, where FIG. 7 is a sectional view of the valve needle and screw rod assembly, and FIG. 8 is an exploded view of the valve needle and screw rod assembly.

The valve needle 11 and the valve needle sleeve 12 may be fixedly connected by welding, etc. One end of the valve needle 11 includes a valve needle sealing portion 111, the valve needle sealing portion 111 is configured to cooperate with the valve port sealing portion 2111 to close the valve port 211. The valve needle sleeve 12 includes a peripheral wall portion 122 located on its outer periphery and a fitting portion 121 integrally formed with the peripheral wall portion 122. Of course, the peripheral wall portion 122 and the fitting portion 121 may also be fixedly connected by welding, clamping, etc. In addition, an inner diameter of the peripheral wall portion 122 is larger than an inner diameter of the fitting portion 121. After the valve needle 11 and the valve needle sleeve 12 are fixedly connected, an accommodating cavity A is formed. That is, the accommodating cavity A is defined by the valve needle 11 and the valve needle sleeve 12.

The washer portion 13 in this embodiment may employ a combination of a split retaining ring and a washer. That is, in this embodiment, the washer portion 13 includes both a split retaining ring and a washer. Of course, starting from the functional principle of the present application, the split retaining ring of the washer portion 13 in this embodiment is not limited to the C-shaped split retaining ring shown in the figures, and other shapes of split retaining rings may also be used instead. Similarly, the washer in this embodiment is not limited to the circular ring-shaped washer in the figures, and may also be replaced by other retaining rings that play the same role, for example, a split retaining ring may also be used instead.

In this embodiment, when the valve needle sleeve 12 fixedly connected to the valve needle 11 and the screw rod 151 rotate relative to each other, rotational friction fitting surfaces mainly lie on upper and lower surfaces of the split retaining ring, or on upper and lower surfaces of the washer. In order to further reduce the frictional resistance due to the relative rotation, it is preferable to spray or plate a coating with lubrication and wear-resistant functions on the surfaces (for example, a coating containing polytetrafluoroethylene, or graphite, or molybdenum disulfide), which may increase the service life of the electronic expansion valve.

The screw rod assembly 15 includes a lower stop portion 153, and the lower stop portion 153 abuts against the washer portion 13. Specifically, in this embodiment, the screw rod 151 includes a below-spring groove portion 1511, and the below-spring groove portion 1511 is formed by being recessed from a surface of the screw rod 151. In this case, a lower flange portion 1531 is formed on the screw rod assembly 15. In this embodiment, the lower stop portion 153 is the lower flange portion 1531.

The washer portion 13 is arranged in the below-spring groove portion 1511, in this case, the washer portion 13 is limitedly connected to the below-spring groove portion 1511.

It should be noted that the lower flange portion 1531 may also be formed in different ways. For example, the screw rod 151 is not provided with the below-spring groove portion 1511, and the lower flange portion 1531 may be formed by a lower end of the screw rod 151 extending peripherally from the surface thereof. In this case, the lower flange portion 1531 may still abut against the washer portion 13.

In addition, the screw rod assembly 15 further includes an upper stop portion 155, and the upper stop portion 155 abuts against the spring 14. Specifically, in this embodiment, the screw rod assembly 15 includes an upper flange portion 1551, and the upper flange portion 1551 extends peripherally from the surface of the screw rod 151. The upper flange portion 1551 and the screw rod 151 may be integrally formed, or fixedly connected by welding, etc. In this embodiment, the upper stop portion 155 is the upper flange portion 1551.

In addition, the spring 14 is sleeved on the screw rod 151. Specifically, one end of the spring 14 abuts against the upper flange portion 1551, and another end of the spring 14 abuts against the washer portion 13. Under the action of the spring 14, the washer portion 13 abuts against the lower flange portion 1531. It should be noted that, the end of the spring 14 abuts against the upper flange portion 1551 includes the case that the end of the spring 14 directly abuts against the upper flange portion 1551, and the case that the end of the spring 14 indirectly abuts against the upper flange portion 1551, for example, a retaining ring or another component is provided between the spring 14 and the upper flange portion 1551.

Since the washer portion 13 is limitedly connected to the below-spring groove portion 1511, due to the influence of the spring 14 on the washer portion 13, the washer portion 13 abuts against the lower flange portion 1531.

In the electronic expansion valve according to this embodiment, the spring 14 is sleeved on the screw rod 151, and an upper end of the spring 14 abuts against the upper stop portion 155, and a lower end of the spring 14 abuts against the lower stop portion 153. The cooperation of the spring 14 and the screw rod assembly 15 may relatively reduce the deflection of the spring 14, thereby reducing wear caused by eccentricity.

In addition, the valve needle and screw rod assembly 1 according to this embodiment further includes a valve needle support portion 154, and the valve needle support portion 154 abuts against the fitting portion 121. Specifically, in this embodiment, the screw rod assembly 15 includes a bushing component 156. The bushing component 156 includes a connecting hole portion 1561, a body portion 1562, and a suspension engagement portion 1563. The connecting hole portion 1561 may have a through hole or a blind hole, and one end of the screw rod 151 may be fixedly connected to the connecting hole portion 1561 by welding, interference fit, or the like.

The suspension engagement portion 1563 extends peripherally around the body portion 1562, and an outer diameter of the suspension engagement portion 1563 is larger than an outer diameter of the body portion 1562. In this embodiment, the valve needle support portion 154 is the suspension engagement portion 1563, and the outer diameter of the suspension engagement portion 1563 is larger than the inner diameter of the fitting portion 121.

In addition, when the valve port is fully opened or the like, a distance D1 between the suspension engagement portion 1563 and the first retaining ring 13 is greater than or equal to a distance D2 between the suspension engagement portion 1563 and an upper end of the fitting portion 121.

In this case, the valve needle 11 may be suspended on the suspension engagement portion 1563 through the valve needle sleeve 12. Since the valve needle 11 is suspended on the suspension engagement portion 1563 via the valve needle sleeve 12, the valve needle 11 is not subjected to the elastic load generated by the spring 14.

Please specifically refer to FIG. 3, FIG. 3 is a partial sectional view showing the electronic expansion valve according to the first embodiment of the present application in a fully open state. When the electronic expansion valve is in the fully open state, a stroke of the valve needle 11 from the valve port 211 is L. In this case, the valve needle and screw rod assembly 1 is at an uppermost end of its stroke, the spring 14 is in an initial compressed state, the slidable washer portion 13 provided on the valve needle and screw rod assembly 1 abuts on an upper surface of the lower flange portion 1531, and the valve needle 11 is not subjected to the elastic load generated by the spring 14. The valve needle 11 is suspended on the suspension engagement portion 1563 via the valve needle sleeve 12. A lower surface of the washer portion 13 abuts against the upper surface of the lower flange portion 1531. In this case, there is still a certain amount of clearance D1-D2 between the lower surface of the washer portion 13 and an upper surface of the fitting portion 121, so the valve needle is not subjected to the elastic load generated by the spring 14. In this case, the valve needle 11 is suspended and supported by the suspension engagement portion 1563 of the bushing component 156.

In addition, as the rotor assembly 4 rotates, the screw rod 151 moves along the axial direction, and a distance between the valve needle sealing portion 111 of the valve needle 11 and the valve port sealing portion 2111 of the valve port 211 also changes.

Please specifically refer to FIG. 4, FIG. 4 is a partial sectional view showing the valve needle sealing portion and the valve port sealing portion according to the first embodiment of the electronic expansion valve of the present application just getting into contact with each other. The electronic expansion valve changes from the fully open state to a state that the valve needle sealing portion 111 just gets into contact with the valve port sealing portion 2111 at this time, a downward displacement of the valve needle 11 is L. During this process, the spring 14 is always in its initial compressed state, the lower stop portion 153 provided on the screw rod 151 always abuts against the lower flange portion 1531 of the screw rod assembly 15, the valve needle 11 is not subjected to the elastic load generated by the compression spring 14 in this state, and the certain amount of clearance D1-D2 is still kept between the lower surface of the first retaining ring 13 and the upper surface of the fitting portion 121 of the valve needle sleeve 12.

Please specifically refer to FIG. 5, FIG. 5 is a partial sectional view showing the electronic expansion valve according to the first embodiment of the present application at a critical position before the spring is further compressed. Compared with the state in FIG. 4, the screw rod 151 in FIG. 5 further performs a downward displacement amount of D1-D2. At this time, the lower surface of the washer portion 13 and the upper end of the fitting portion 121 of the valve needle sleeve 12 are just at a critical position of being in contact with each other, which is equivalent to that the spring 14 is at the critical position to be further compressed, and is also equivalent to that the valve needle 11 and the valve needle sleeve 12 are at the critical position to be subjected to the elastic load of the compression spring 14 that to be further compressed.

Please specifically refer to FIG. 6, FIG. 6 is a partial sectional view of the electronic expansion valve according to the first embodiment of the present application in the fully closed state. Compared with the state in FIG. 5, the screw rod 151 in FIG. 6 is moved downward by a displacement amount of a, in this case, the lower surface of the washer portion 13 and the fitting portion 121 of the valve needle sleeve 12 tightly abut against each other, and the spring 14 has been further compressed; the valve needle sealing portion 111 of the valve needle and screw rod assembly 1 and the valve port sealing portion 2111 of the valve seat assembly 2 are in contact with and pressed tightly against each other, the washer portion 13 provided on the screw rod 151 abuts against the upper surface of the fitting portion 121 of the valve needle sleeve 12, and the valve needle 11 is subjected to the load of the elastic force generated by the spring 14 that is further compressed. In this case, the electronic expansion valve is in the fully closed state, the screw rod 151 is at a lowest position of its stroke, and the downward stroke of the screw rod 151 from the fully open state to the fully closed state is L+α.

Figure 9:
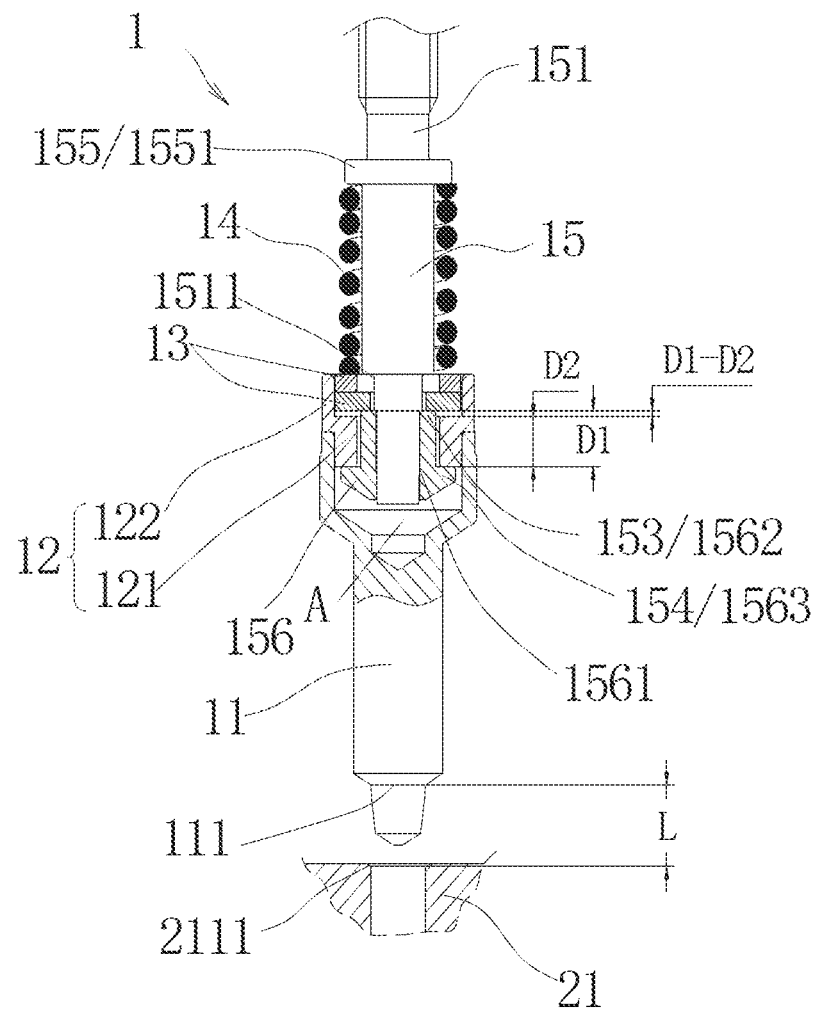
FIG. 9 is a partial sectional view of an electronic expansion valve according to a second embodiment of the present application in a fully open state.

Please specifically refer to FIG. 9, FIG. 9 is a partial sectional view of an electronic expansion valve according to a second embodiment of the present application in a fully open state.

In order to facilitate the description of this embodiment, the same reference numerals are used for the components in this embodiment and the first embodiment that have the same structure and have the same function, description of the components in the first embodiment is also applicable to the second embodiment, and those of the second embodiment that differ from the first embodiment are described in detail hereinafter.

In this embodiment, the screw rod assembly 15 includes a lower stop portion 153, and the lower stop portion 153 abuts against the washer portion 13. Specifically, the screw rod assembly 15 includes a bushing component 156. The bushing component 156 includes a connecting hole portion 1561, a body portion 1562, and a suspension engagement portion 1563. The connecting hole portion 1561 may be a through hole or a blind hole. One end of the screw rod 151 may be fixedly connected with the connecting hole portion 1561 by welding, interference fit, or the like.

According to the electronic expansion valve in this embodiment, the spring 14 is sleeved on the screw rod 151, the upper end of the spring 14 abuts against the upper stop portion 155, and the lower end of the spring 14 abuts against the lower stop portion 153. The cooperation between the spring 14 and the screw rod assembly 15 may relatively reduce the deflection of the spring 14, thereby reducing eccentric wear.

The suspension engagement portion 1563 extends peripherally around the body portion 1562, and the outer diameter of the suspension engagement portion 1563 is larger than the outer diameter of the body portion 1562. In this embodiment, the valve needle support portion 154 is the suspension engagement portion 1563, in this case, the outer diameter of the suspension engagement portion 1563 is larger than the inner diameter of the fitting portion 121. Therefore, the suspension engagement portion 1563 is able to abut against the fitting portion 121 of the valve needle sleeve 12.

In addition, unlike the first embodiment, the lower stop portion 153 in this embodiment is no longer the lower flange portion 1531. In this case, the lower stop portion 153 is the body portion 1562 of the bushing component 156. That is, in this embodiment, the body portion 1562 and the washer portion 13 is able to abut against each other.

It is worth noting that "able" or "may" in the present application refers to a specific state, but does not mean all working states of the electronic expansion valve. For example, in this embodiment, the body portion 1562 is able to abut against the washer portion 13, which refers to a situation that that the valve port 211 is fully opened or the like.

Of course, in this case, the distance D1 between the suspension engagement portion 1563 and the first retaining ring 13 and the distance D2 between the suspension engagement portion 1563 and the upper end of the fitting portion 121 still satisfy D1≥D2.

Figure 10:
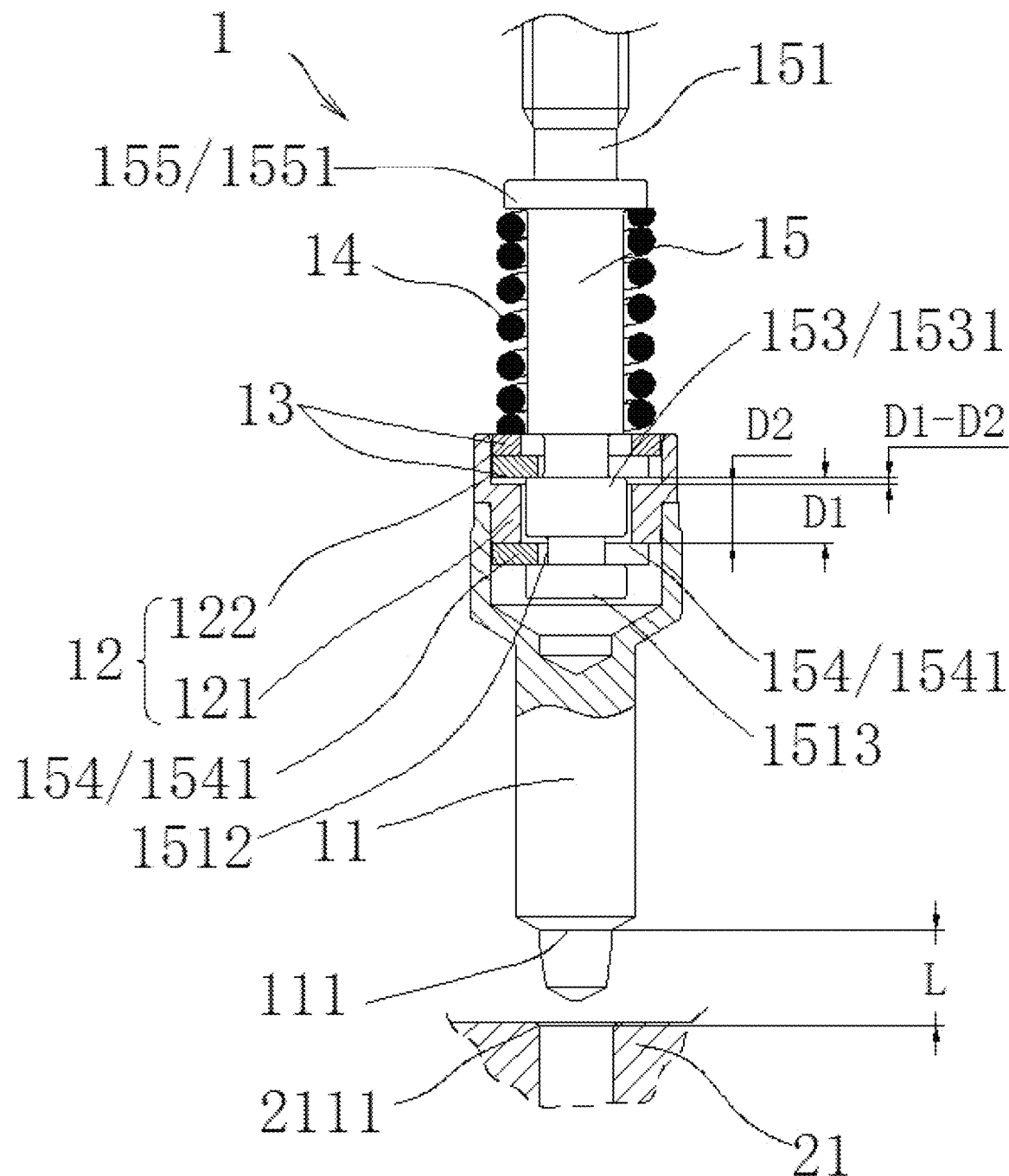
FIG. 10 is a partial sectional view showing an electronic expansion valve according to a third embodiment of the present application in a fully open state.

Please specifically refer to FIG. 10, FIG. 10 is a partial sectional view showing an electronic expansion valve according to a third embodiment of the present application in a fully open state.

In order to facilitate the description of this embodiment, the same reference numerals are used for the components in this embodiment and the first embodiment that have the same structure and have the same function, description of the components in the first embodiment is also applicable to the third embodiment, and those of the second embodiment that differ from the first embodiment are described in detail hereinafter.

In this embodiment, the screw rod assembly 15 includes a valve needle support portion 154, and the upper surface of the valve needle support portion 154 may abut against the fitting portion 121 of the valve needle sleeve 12. Specifically, the screw assembly 15 includes a valve needle support washer 1541. In addition, a valve needle support groove portion 1512 and a valve needle support flange portion 1513 are also provided on the screw rod 151. The valve needle support groove portion 1512 is recessed from the surface of the screw rod 151. Thus, the valve needle support flange portion 1513 located below the valve needle support groove portion 1512 protrudes peripherally relative to the valve needle support groove portion 1512. The valve needle support washer 1541 is assembled in the valve needle support groove portion 1512. Specifically, the valve needle support washer 1541 and the valve needle support groove portion 1512 are fixedly connected or limitedly connected.

It is worth noting that the valve needle support flange portion 1513 may also be formed in other manners. For example, the screw rod 151 is not provided with the valve needle support groove portion 1512, and the valve needle support flange portion 1513 may be formed by the lower end of the screw rod 151 extending peripherally around its surface. In this case, the valve needle support flange portion 1513 is still able to abut against the valve needle support washer 1541.

In the electronic expansion valve according to this embodiment, the spring 14 is sleeved on the screw rod 151, the upper end of the spring 14 abuts against the upper stop portion 155, and the lower end of the spring 14 abuts against the lower stop portion 153. The cooperation between the spring 14 and the screw rod assembly 15 may relatively reduce the deflection of the spring 14, thereby reducing eccentric wear.

In this case, the valve needle support portion 154 is the valve needle support washer 1541, and the upper surface of the valve needle support washer 1541 may abut against the fitting portion 121 of the valve needle sleeve 12. When the valve port 211 is opened or the like, the valve needle 11 is able to be supported by the valve needle support washer 1541 via the valve needle sleeve 12 fixedly connected to the valve needle 11.

The difference from the first embodiment is that, the valve needle support portion 154 in this embodiment is no longer the suspension engagement portion 1563, in this case, the valve needle support portion 154 is the valve needle support washer 1541. That is, in this embodiment, the fitting portion 121 and the valve needle support washer 1541 may abut against each other.

It is worth noting that the "able" or "may" in the present application refers to a specific state, but does not mean all states of the electronic expansion valve. For example, in this embodiment, the fitting portion 121 and the valve needle support washer 1541 may abut against each other, which refers to the situation that the valve port 211 is fully opened or the like.

Of course, in this case, the distance D1 between the valve needle support washer 1541 and the first retaining ring 13 and the distance D2 between the valve needle support washer 1541 and the upper end of the fitting portion 121 still satisfy D1≥D2.

In order to further reduce a rotational frictional resistance of the fitting portion 121 relative to the screw rod 151, a coating with lubricating and wear-resisting functions (for example, a coating containing polytetrafluoroethylene, graphite or molybdenum disulfide) may be sprayed or plated on the surface of the valve needle support washer 1541, so as to prolong the service life of the electronic expansion valve.

Figure 11:
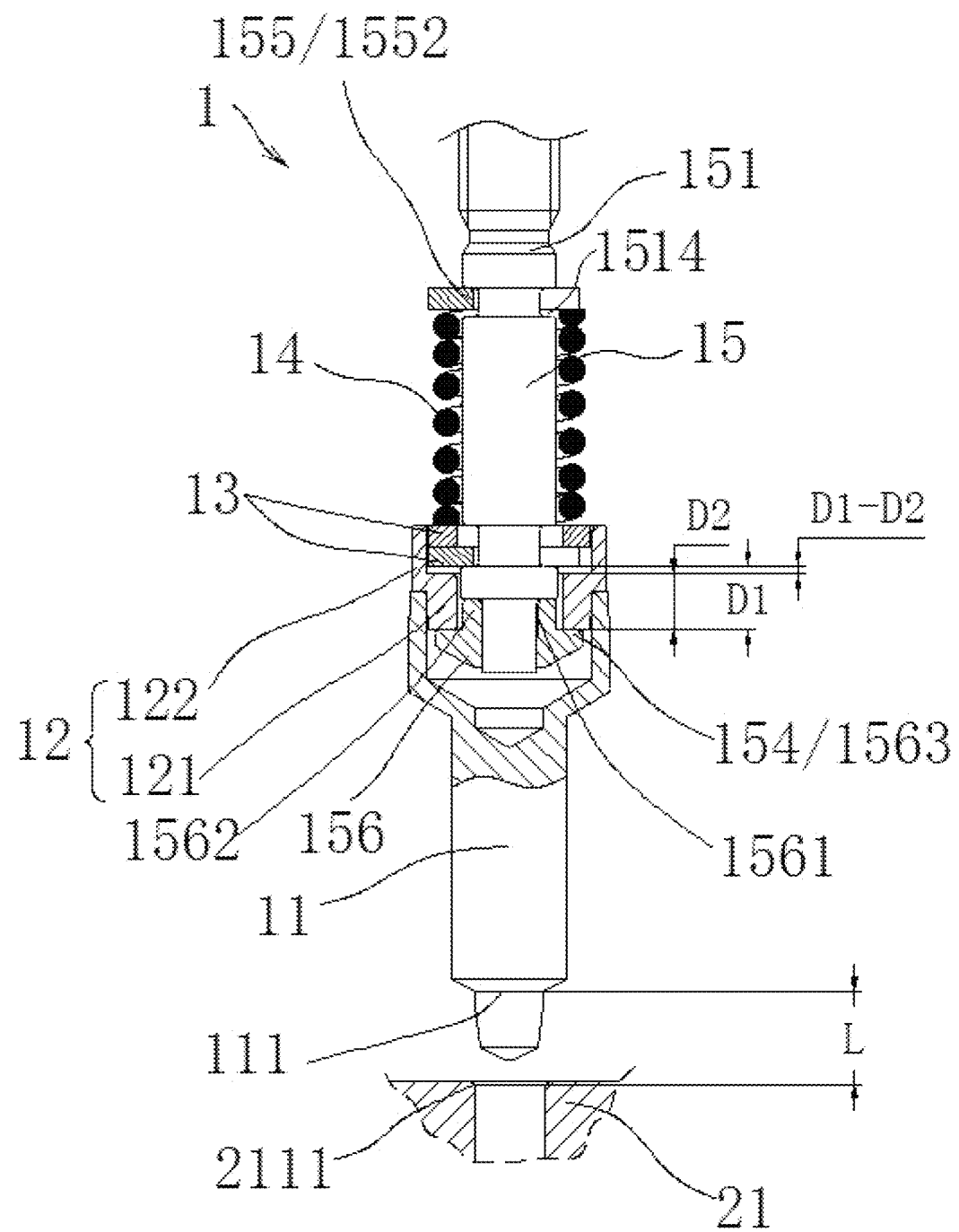
FIG. 11 is a partial sectional view showing an electronic expansion valve according to a fourth embodiment of the present application in a fully open state.

Please specifically refer to FIG. 11, FIG. 11 is a partial sectional view showing an electronic expansion valve according to a fourth embodiment of the present application in a fully open state.

In order to facilitate the description of this embodiment, the same reference numerals are used for the components in this embodiment and the first embodiment that have the same structure and have the same function, description of the components in the first embodiment is also applicable to the fourth embodiment, and those of the fourth embodiment that differ from the first embodiment are described in detail hereinafter.

In this embodiment, the screw rod assembly 15 includes an upper stop portion 155, and the upper stop portion 155 abuts against the spring 14. Specifically, in this embodiment, the screw rod assembly 15 is equipped with an upper retaining ring 1552. In addition, the screw rod 151 is provided with an above-spring annular groove 1514. The above-spring annular groove 1514 is recessed from the surface of the screw rod 151, and the upper retaining ring 1552 is assembled in the above-spring annular groove 1514. Specifically, the upper retaining ring 1552 is fixedly connected or limitedly connected with the above-spring annular groove 1514, that is, it is clamped in the above-spring annular groove 1514 for position limiting.

In the electronic expansion valve according to this embodiment, the spring 14 is sleeved on the screw rod 151, the upper end of the spring 14 abuts against the upper stop portion 155, and the lower end of the spring 14 abuts against the lower stop portion 153. The cooperation between the spring 14 and the screw rod assembly 15 may relatively reduce the deflection of the spring 14, thereby reducing eccentric wear.

The difference from the first embodiment is that, the upper stop portion 155 in this embodiment is no longer the upper flange portion 1551, in this case, the upper stop portion 155 is the upper retaining ring 1552. That is, in this embodiment, the upper retaining ring 1552 abuts against the spring 14.

In this case, the spring 14 is sleeved on the shaft of the screw rod 151, and the upper end of the spring 14 abuts against the lower end surface of the upper retaining ring 1552. It is worth noting that the present application does not limit the number of retaining rings of the upper retaining ring 1552. Specifically, the upper retaining ring 1552 which is arranged in the above-spring annular groove 1514 of the screw rod 151 may be formed by a split retaining ring, and one or more retaining rings may be further provided at a lower side of the split retaining ring.

Of course, in this case, the distance between the suspension engagement portion 1563 and the lower flange portion 1531 is D1, the distance between the suspension engagement portion 1563 and the upper end of the fitting portion 121 is D2, which still satisfy D1≥D2.

In this embodiment, when relative rotation between the valve needle 11 and the screw rod 151 occurs, a rotational friction surface may be between the upper end of the spring 14 and the upper retaining ring 1552. In order to further reduce the frictional resistance of the relative rotation, a coating with lubricating and wear-resisting functions may be sprayed or plated on the surface of the upper retaining ring 1552 (for example, a coating containing polytetrafluoroethylene, or graphite, or molybdenum disulfide), so as to increase the service life of the electronic expansion valve.

Figure 12:
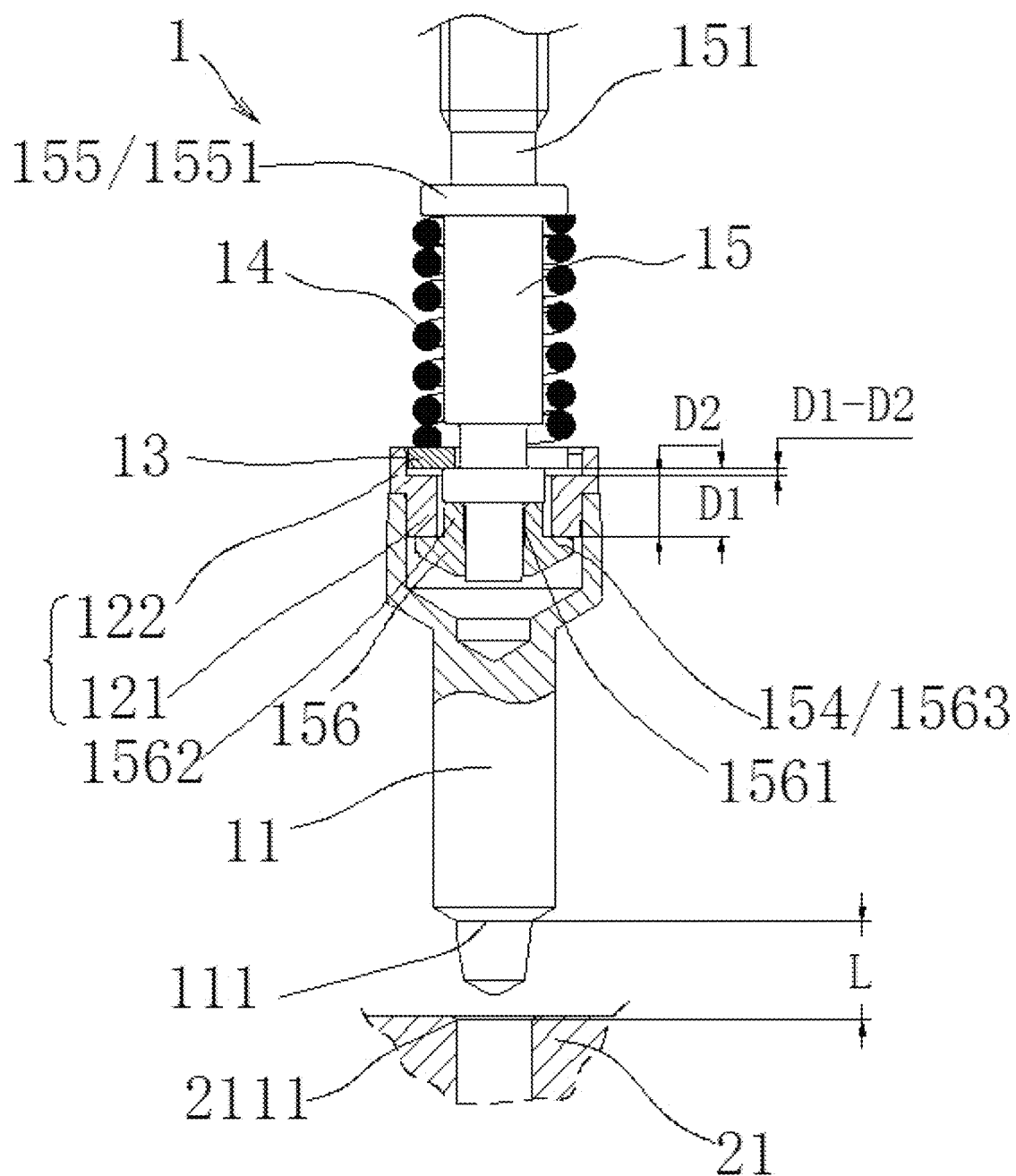
FIG. 12 is a partial sectional view showing an electronic expansion valve according to a fifth embodiment of the present application in a fully open state.

Please specifically refer to FIG. 12, FIG. 12 is a partial sectional view showing an electronic expansion valve according to a fifth embodiment of the present application in a fully open state.

In order to facilitate the description of this embodiment, the same reference numerals are used for the components in this embodiment and the first embodiment that have the same structure and have the same function, the description of the components in the first embodiment is also applicable to the fifth embodiment, and those of the fifth embodiment that differ from the first embodiment are described in detail hereinafter.

The difference from the first embodiment is that in this embodiment, the number of the washer portion 13 is one. This embodiment illustrates that in the present application, the number of washers in the washer portion 13 is not limited.

In the electronic expansion valve according to this embodiment, the spring 14 is sleeved on the screw rod 151, the upper end of the spring 14 abuts against the upper stop portion 155, and the lower end of the spring 14 abuts against the lower stop portion 153. The cooperation between the spring 14 and the screw rod assembly 15 may relatively reduce the deflection of the spring 14, thereby reducing eccentric wear.

Of course, in this case, the distance between the suspension engagement portion 1563 and the washer portion 13 is D1, the distance between the suspension engagement portion 1563 and the upper end of the fitting portion 121 is D2, which still satisfy D1≥D2.

Figure 13:
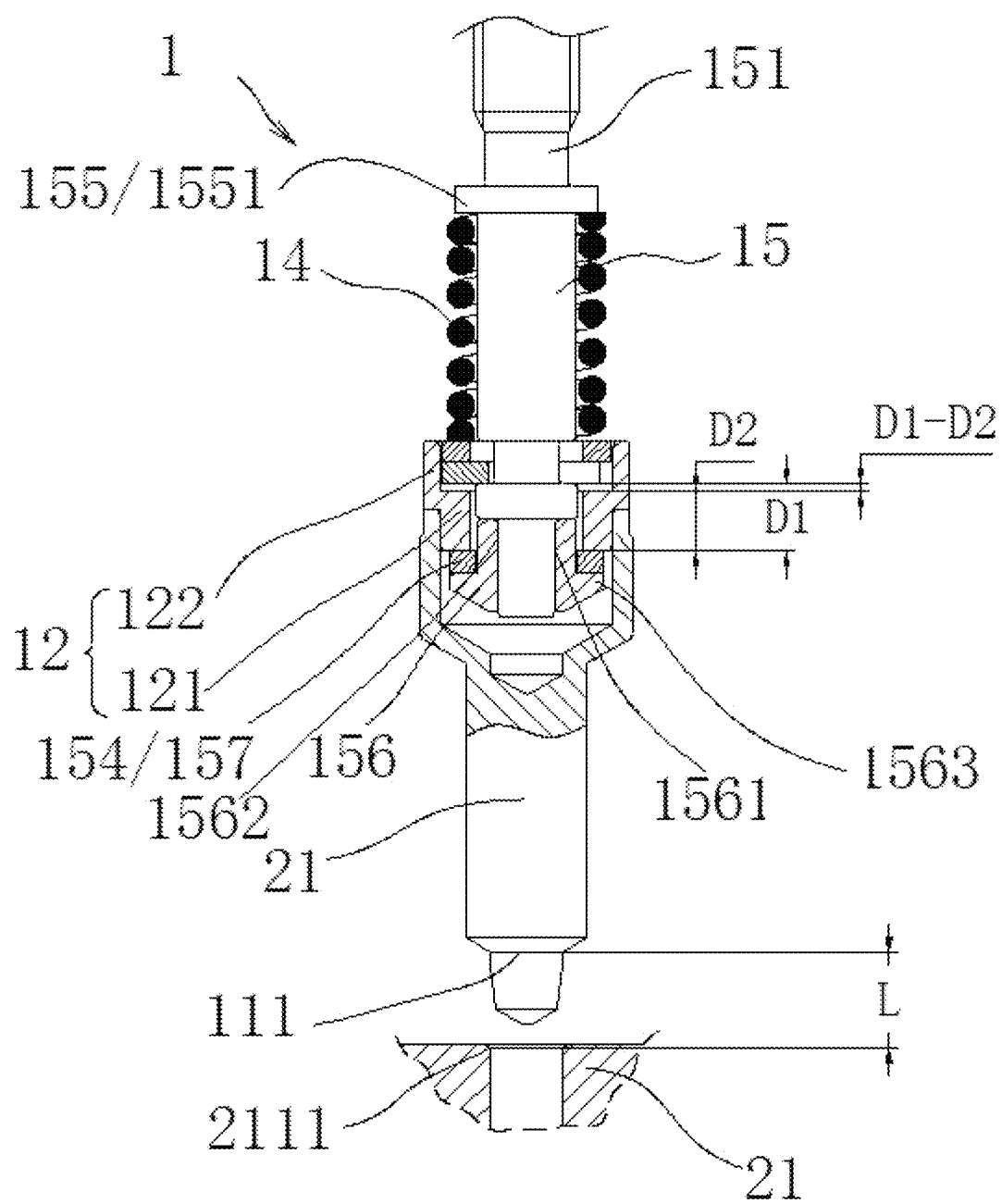
FIG. 13 is a partial sectional view showing an electronic expansion valve according to a sixth embodiment of the present application in a fully open state.

Please specifically refer to FIG. 13, FIG. 13 is a partial sectional view showing an electronic expansion valve according to a sixth embodiment of the present application in a fully open state.

In order to facilitate the description of this embodiment, the same reference numerals are used for the components in this embodiment and the first embodiment that have the same structure and have the same function, the description of the components in the first embodiment is also applicable to the sixth embodiment, and those of the sixth embodiment that differ from the first embodiment are described in detail hereinafter.

In this embodiment, a bushing washer 157 is further provided between the bushing component 156 and the valve needle sleeve 12. When the valve needle 11 is not subjected to the elastic load generated by the spring 14, the valve needle 11 and the valve needle sleeve 12 are suspended on the suspension engagement portion 1563 of the bushing component 156 via the bushing washer 157.

In this case, the valve needle support portion 154 is a bushing washer 157, and the upper surface of the bushing washer 157 and the lower surface of the fitting portion 121 of the valve needle sleeve 12 may abut against each other.

In the electronic expansion valve according to this embodiment, the spring 14 is sleeved on the screw rod 151, and the upper end of the spring 14 abuts against the upper stop portion 155, and the lower end of the spring 14 abuts against the lower stop portion 153. The cooperation between the spring 14 and the screw rod assembly 15 may relatively reduce the deflection of the spring 14, thereby reducing eccentric wear.

This embodiment illustrates that: in the present application, the upper end of the suspension engagement portion 1542 may abut against the fitting portion 121 of the valve needle sleeve 12, which is not limited to direct abutment, but also includes indirect abutment between the two.

Of course, in this case, the distance between the bushing washer 157 and the washer portion 13 is D1, the distance between the bushing washer 157 and the upper end of the fitting portion 121 is D2, which still satisfy D1≥D2.

In order to further reduce the rotational friction resistance between the fitting portion 121 of the valve needle sleeve 12 and the screw rod 151, preferably, a coating with lubricating and wear-resisting functions (for example, a coating containing polytetrafluoroethylene, graphite or molybdenum disulfide) may be sprayed or plated on the surface of the bushing washer 157, so as to prolong the service life of the electronic expansion valve.

Figure 14:
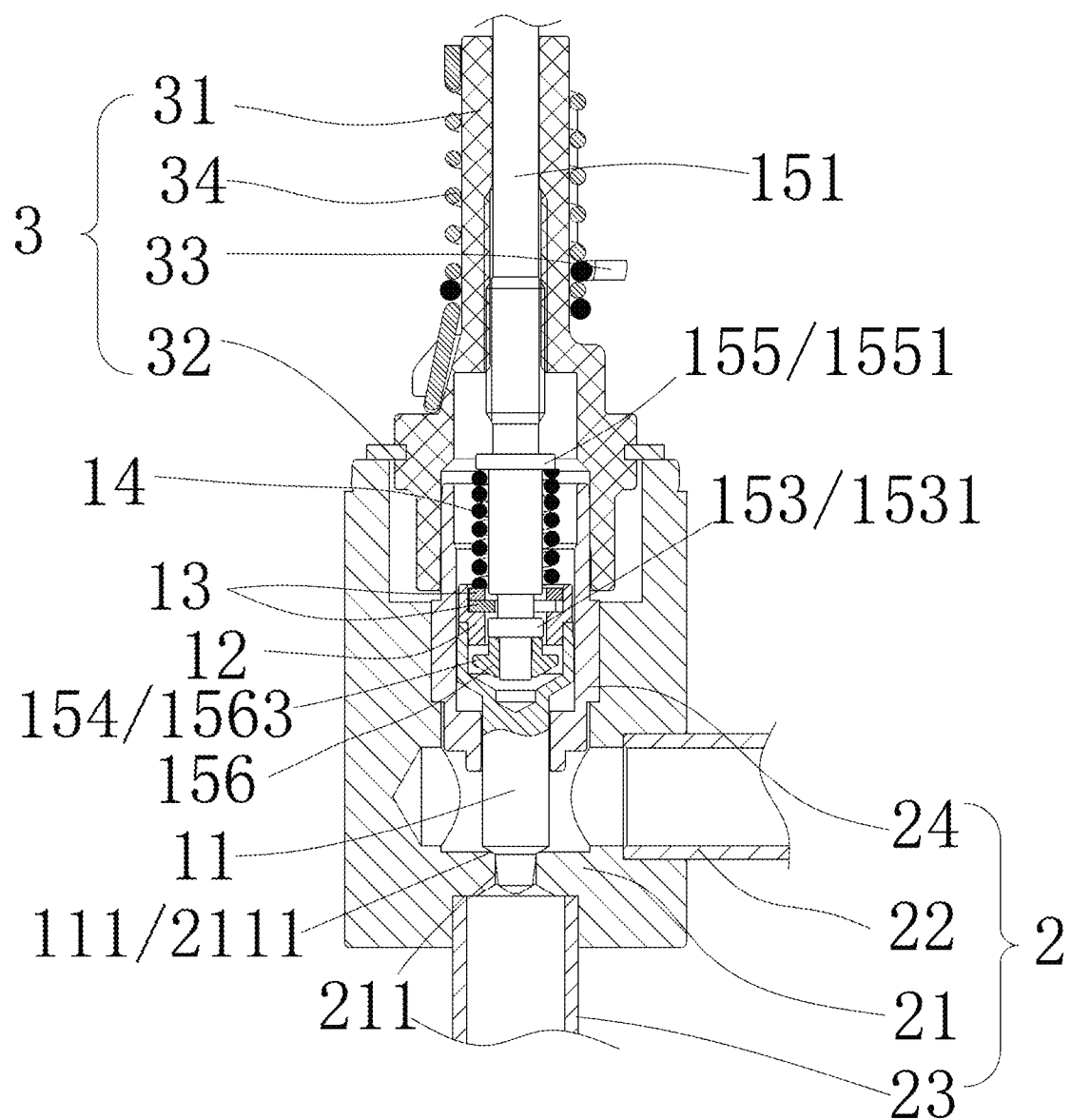
FIG. 14 is a partial sectional view showing an electronic expansion valve according to a seventh embodiment of the present application in a fully open state.

Please specifically refer to FIG. 14, FIG. 14 is a partial sectional view showing an electronic expansion valve according to a seventh embodiment of the present application in a fully open state.

It should be noted that the main object of the present application is to improve the valve needle and screw rod assembly 1 of the electronic expansion valve. For other parts of the electronic expansion valve such as the magnetic rotor assembly, the nut assembly, the stop device, etc., general technology may be used, and other electronic expansion valve structures that can achieve the same function may also be used.

In order to facilitate the description of this embodiment, the same reference numerals are used for the components in this embodiment and the first embodiment that have the same structure and have the same function, the description of the components in the first embodiment is also applicable to the seventh embodiment, and those of the seventh embodiment that differ from the first embodiment are described in detail hereinafter.

For example, in this embodiment, the structure of the valve seat assembly 2 is slightly different. The valve seat assembly includes the valve seat 21, the first connecting pipe portion 22, the second connecting pipe portion 23, and the guide seat 24 which are fixedly assembled. The nut assembly 30 in this embodiment is fixedly connected to the upper side of the valve seat assembly 2 (specifically connected to the upper side of the valve seat 21) through the nut connecting portion 32, preferably is fixedly connected by welding.

In this embodiment, the guide seat 24 cooperates with the valve needle and screw rod assembly 1, and the guide seat 24 has a guiding function for the valve needle and screw rod assembly 1.

In the electronic expansion valve according to this embodiment, the spring 14 is sleeved on the screw rod 151, the upper end of the spring 14 abuts against the upper stop portion 155, and the lower end of the spring 14 abuts against the lower stop portion 153. The cooperation between the spring 14 and the screw rod assembly 15 may relatively reduce the deflection of the spring 14, thereby reducing eccentric wear.

Figure 15:
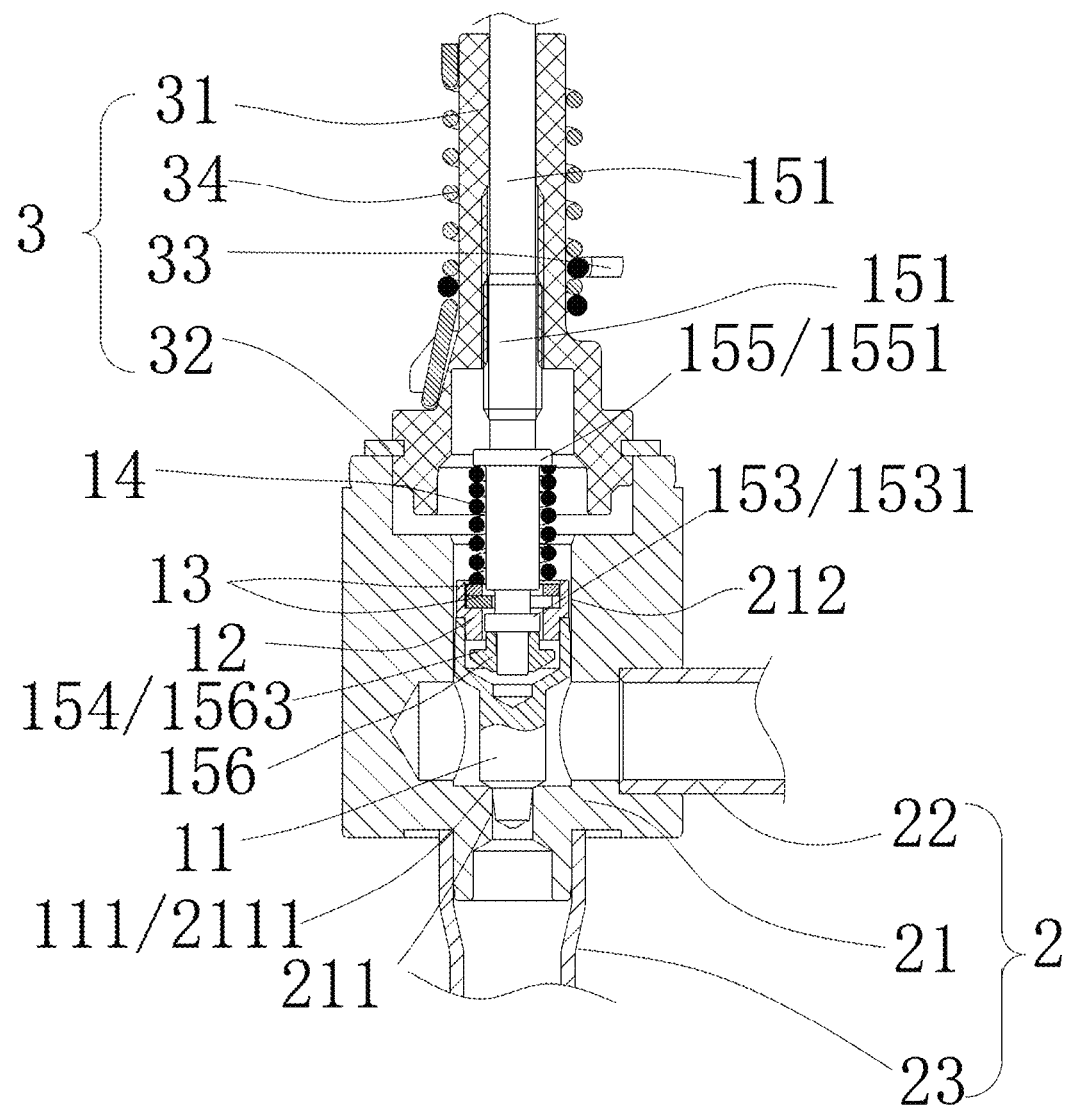
FIG. 15 is a partial sectional view showing an electronic expansion valve according to an eighth embodiment of the present application in a fully open state.

Referring to FIG. 15, FIG. 15 is a partial sectional view showing an electronic expansion valve according to an eighth embodiment of the present application in a fully open state.

In order to facilitate the description of this embodiment, the same reference numerals are used for the components in this embodiment and the first embodiment that have the same structure and have the same function, the description of the components in the first embodiment is also applicable to the eighth embodiment, and those of the eighth embodiment differ from the first embodiment are described in detail hereinafter.

In this embodiment, the valve seat assembly 2 includes the valve seat 21, the first connecting pipe portion 12 and the second connecting pipe portion 13 which are fixedly assembled. A central inner hole position of the valve seat 21 of the valve seat assembly 2 is provided with an inner hole guide portion 212 that cooperates with the valve needle and screw rod assembly 1. When the electronic expansion valve is being opened or closed, the inner hole guide portion 212 of the valve seat 21 provides a guiding function for the valve needle and screw rod assembly 1. Specifically, the inner hole guide portion 212 of the valve seat 21 cooperates with the outer edge of the valve needle 11 and/or the peripheral wall portion 122 of the valve needle sleeve 12, to provide guidance for the valve needle and screw rod assembly 1.

In the electronic expansion valve according to this embodiment, the spring 14 is sleeved on the screw rod 151, the upper end of the spring 14 abuts against the upper stop portion 155, and the lower end of the spring 14 abuts against the lower stop portion 153. The cooperation between the spring 14 and the screw rod assembly 15 may relatively reduce the deflection of the spring 14, thereby reducing eccentric wear.

Figure 16:
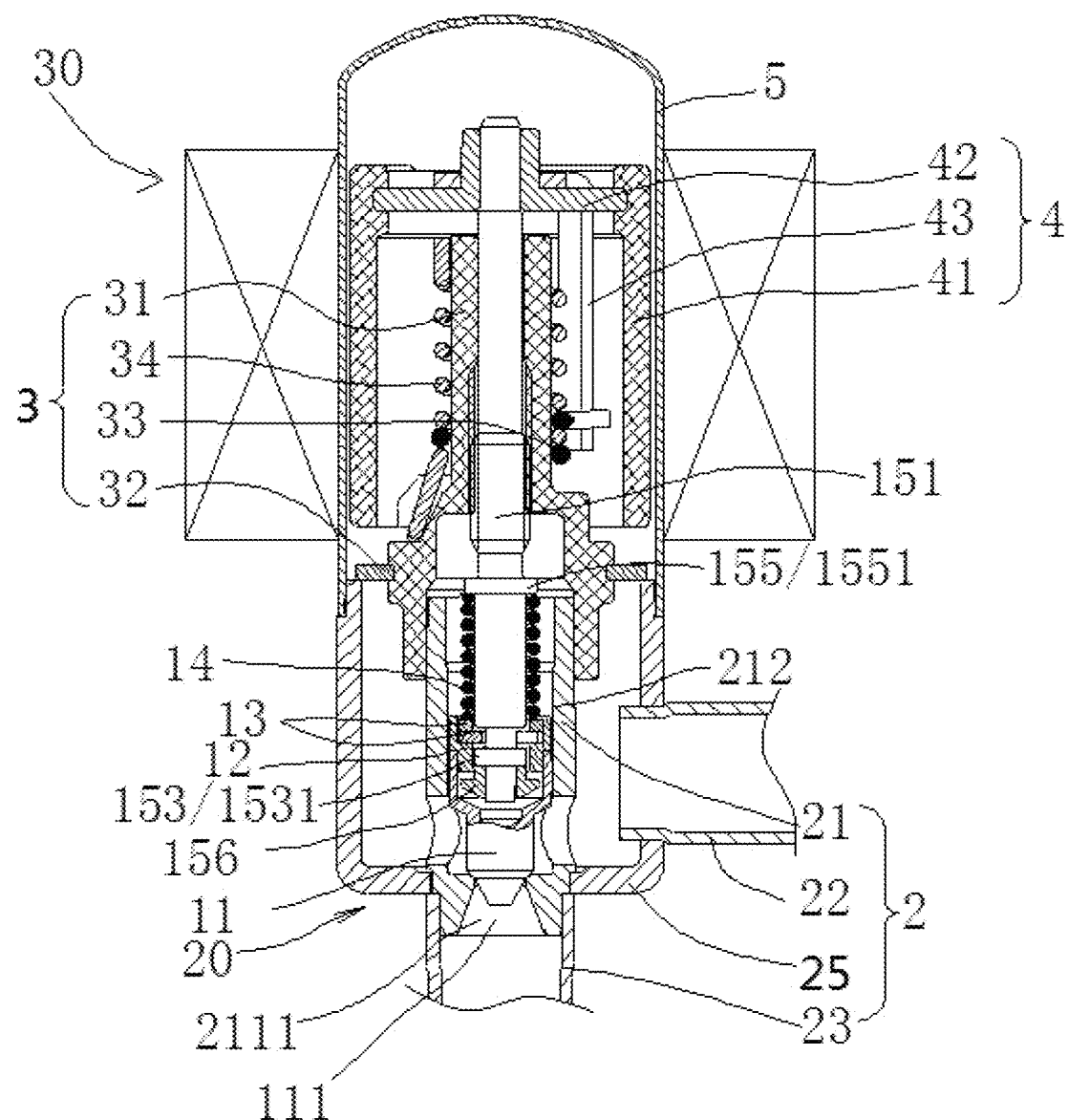
FIG. 16 is a partial sectional view showing an electronic expansion valve according to a ninth embodiment of the present application in a fully open state.

Please specifically refer to FIG. 16, FIG. 16 is a partial sectional view showing an electronic expansion valve according to a ninth embodiment of the present application in a fully open state.

In order to facilitate the description of this embodiment, the same reference numerals are used for the components in this embodiment and the first embodiment that have the same structure and have the same function, the description of the components in the first embodiment is also applicable to the ninth embodiment, and those of the ninth embodiment that differ from the first embodiment are described in detail hereinafter.

In this embodiment, the valve seat assembly 2 includes the valve seat 21, the first connecting pipe portion 22, the second connecting pipe portion 23, and the connecting seat 25 which are fixedly assembled. The first connecting pipe portion 22 is fixedly connected to the connecting seat 25, and the second connecting pipe portion 23 is fixedly connected to the valve seat 21. The inner hole guide portion 212 in this embodiment is provided on an inner hole wall, located at an upper side of the valve port 211, of the valve seat 21. The inner hole guide portion 212 of the valve seat assembly 2 provides a guiding function for the valve needle and screw rod assembly 1. When the electronic expansion valve is being opened and closed, the valve needle and screw rod assembly 1 cooperates with the inner hole guide portion 212 of the valve seat assembly, to realize the guiding function for the valve needle portion. Specifically, the inner hole guide portion 212 of the valve seat 21 cooperates with the outer edge of the valve needle 11 and/or the peripheral wall portion 122 of the valve needle sleeve 12, to provide guidance for the valve needle and screw rod assembly 1.

In the electronic expansion valve according to this embodiment, the spring 14 is sleeved on the screw rod 151, the upper end of the spring 14 abuts against the upper stop portion 155, and the lower end of the spring 14 abuts against the lower stop portion 153. The cooperation between the spring 14 and the screw rod assembly 15 may relatively reduce the deflection of the spring 14, thereby reducing eccentric wear.

Figure 17:
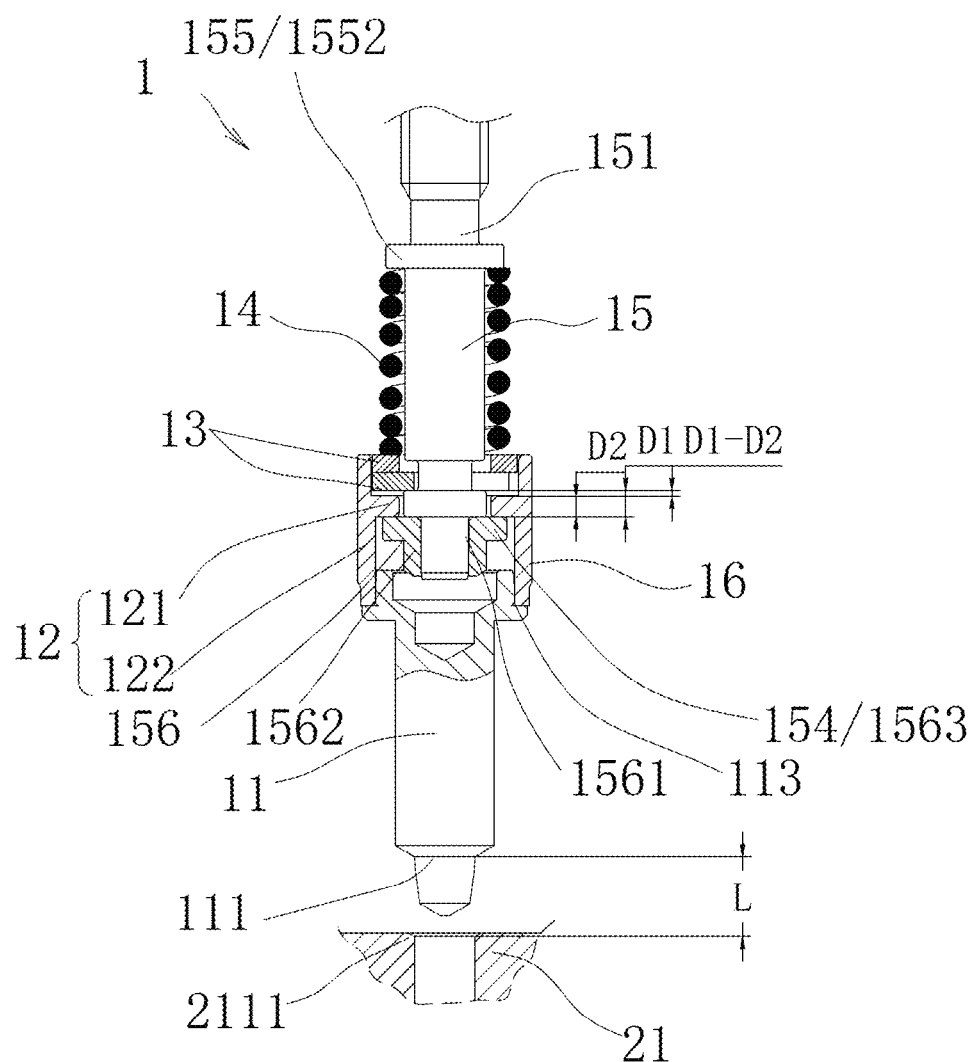
FIG. 17 is a schematic view showing the structure of a valve needle and screw rod assembly.

Please specifically refer to FIG. 17, FIG. 17 is a schematic view showing the structure of a valve needle and screw rod assembly.

In the valve needle and screw rod assembly 1, the structures of the valve needle 11 and the valve needle sleeve 12 are changed. The valve needle includes a step portion 113, the peripheral wall portion 122 of the valve needle sleeve 12 is sleeved on the side surface of the step portion 113 and abuts against the step surface of the step portion 113, and the fitting portion 121 is an annular protrusion extending inwardly from the inner wall of the peripheral wall portion 122. In addition, compared with the above embodiment, the suspension engagement portion 1563 is located at an upper end of the bushing component 156, which makes it easier for the suspension engagement portion 1563 to fit with the fitting portion 121 formed as above. In this case, the valve needle 11 and the valve needle sleeve 12 may be fixedly connected by welding, crimping connection, or the like. In this case, the distance between the suspension engagement portion 1563 and the washer portion 13 of the spring is D1, the distance between the suspension engagement portion 1563 and the upper end of the fitting portion 121 is D2, which still satisfy D1≥D2.

It should be noted that the orientation terms such as up, down, left, right in the embodiments are all based on the drawings of the description, which are introduced for the convenience of illustration; the ordinal numerals such as "first" and "second" in the names of the components are also introduced for the convenience of illustration, which do not intend to make any restriction on any order of the components.

The electronic expansion valve according to the present application is described in detail hereinbefore. The principle and the embodiments of the present application are illustrated herein by specific examples. The above description of examples is only intended to help the understanding of the method and the spirit of the present application. It should be noted that, for those skilled in the art, a few of modifications and improvements may be made to the present application without departing from the principle of the present application, and these modifications and improvements are also deemed to fall into the scope of the present application defined by the claims.

What is claimed is:

1. An electronic expansion valve, comprising a valve needle and screw rod assembly, the valve needle and screw rod assembly comprising a valve needle, a valve needle sleeve, a washer portion, a spring and a screw rod assembly; wherein the valve needle is fixedly connected to the valve needle sleeve, the valve needle sleeve comprises a peripheral wall portion and a fitting portion, and an inner diameter of the fitting portion is smaller than an inner diameter of the peripheral wall portion;

the screw rod assembly comprises a screw rod, a lower stop portion, a valve needle support portion and an upper stop portion, and the lower stop portion is configured to abut against the washer portion, wherein the lower stop portion is between the upper stop portion and the valve needle support portion;

the valve needle support portion is configured to abut against the fitting portion of the valve needle sleeve;

the upper stop portion is configured to abut against the spring; and in a case that the lower stop portion abuts against the washer portion, a distance between the valve needle support portion and the washer portion is D1, a distance between the valve needle support portion and an upper end of the fitting portion is D2, and D1≥D2.

2. The electronic expansion valve according to claim 1, wherein the lower stop portion comprises a lower flange portion, the lower flange portion extends peripherally around the screw rod, the lower flange portion is integrally formed with or fixedly connected to the screw rod, and the lower flange portion is configured to abut against the washer portion.

3. The electronic expansion valve according to claim 1, wherein the screw rod assembly comprises a bushing component, the bushing component comprises a receiving hole portion into which the screw rod is inserted, a body portion, and a suspension engagement portion; the lower stop portion is the body portion, and the body portion is configured to abut against the washer portion.

4. The electronic expansion valve according to claim 3, wherein the suspension engagement portion extends peripherally around the body portion, the valve needle support portion is the suspension engagement portion, and the suspension engagement portion is configured to directly or indirectly abut against the fitting portion of the valve needle sleeve.

5. The electronic expansion valve according to claim 3, wherein the suspension engagement portion extends peripherally around the body portion, the screw rod assembly further comprises a bushing washer, the bushing washer is supported by the suspension engagement portion, the valve needle support portion is the bushing washer, the bushing washer is configured to abut against the fitting portion of the valve needle sleeve, and the suspension engagement portion is configured to indirectly abut against the fitting portion of the valve needle sleeve.

6. The electronic expansion valve according to claim 1, wherein the valve needle support portion comprises a valve needle support washer, the screw rod comprises a valve needle support groove portion and a valve needle support flange portion, the valve needle support washer is connected to the valve needle support groove portion in a fixed manner or in a position-limited manner, and the valve needle support washer is configured to abut against the fitting portion of the valve needle sleeve.

7. The electronic expansion valve according to claim 1, wherein the upper stop portion comprises an upper flange portion, the upper flange portion extends peripherally around the screw rod, the upper flange portion is integrally formed with or fixedly connected to the screw rod, and the upper flange portion abuts against the spring.

8. The electronic expansion valve according to claim 1, wherein the upper stop portion comprises an upper retaining ring, the screw rod comprises an above-spring annular groove, the above-spring annular groove is connected with the upper retaining ring in a position-limited manner or in a fixed manner, and the upper retaining ring abuts against the spring.

9. The electronic expansion valve according to claim 1, wherein a surface of the washer portion is coated with a coating, and the coating comprises polytetrafluoroethylene or graphite or molybdenum disulfide.

\* \* \* \* \*